United States Patent Office 3,073,398
Patented Jan. 15, 1963

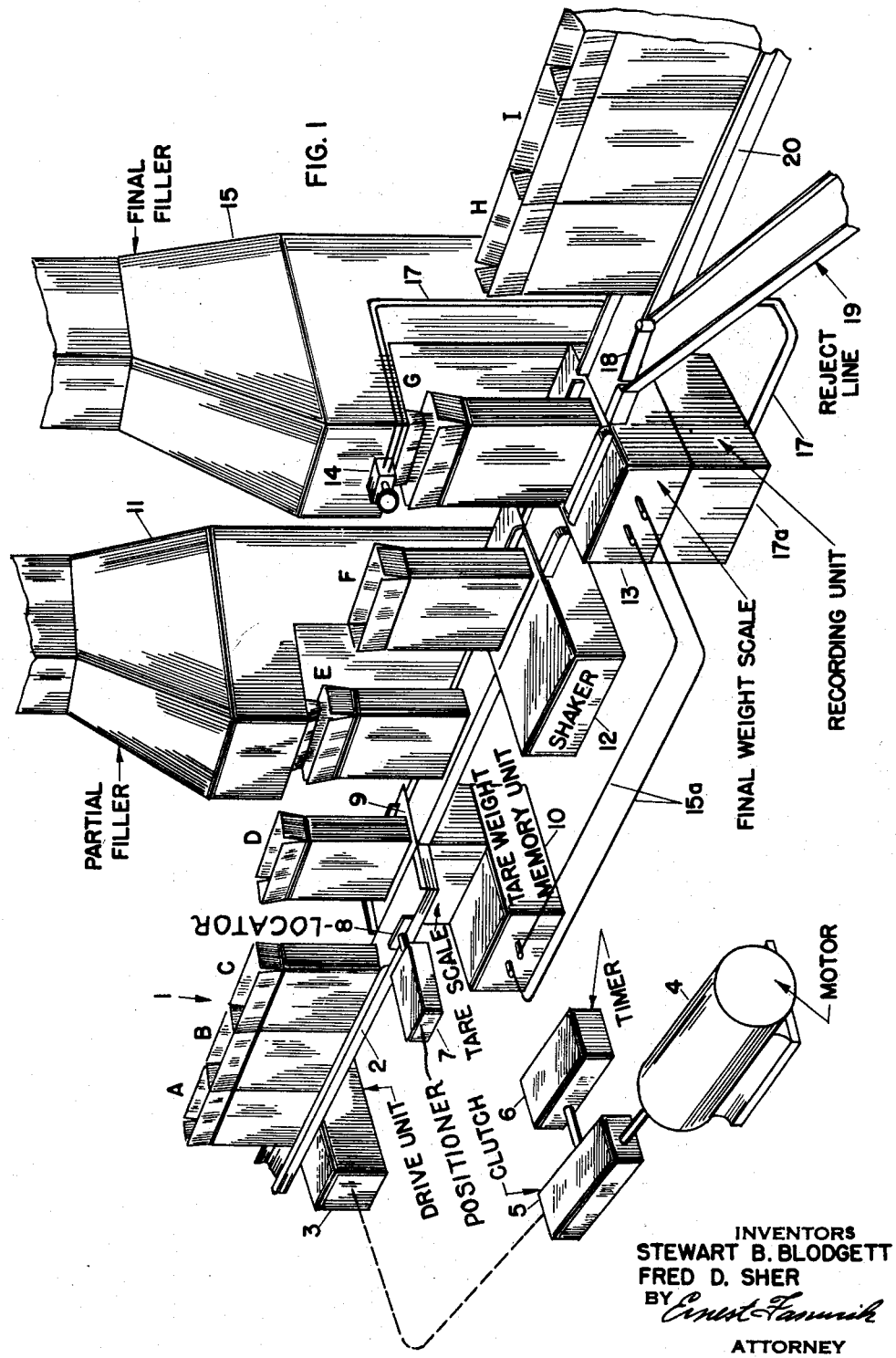

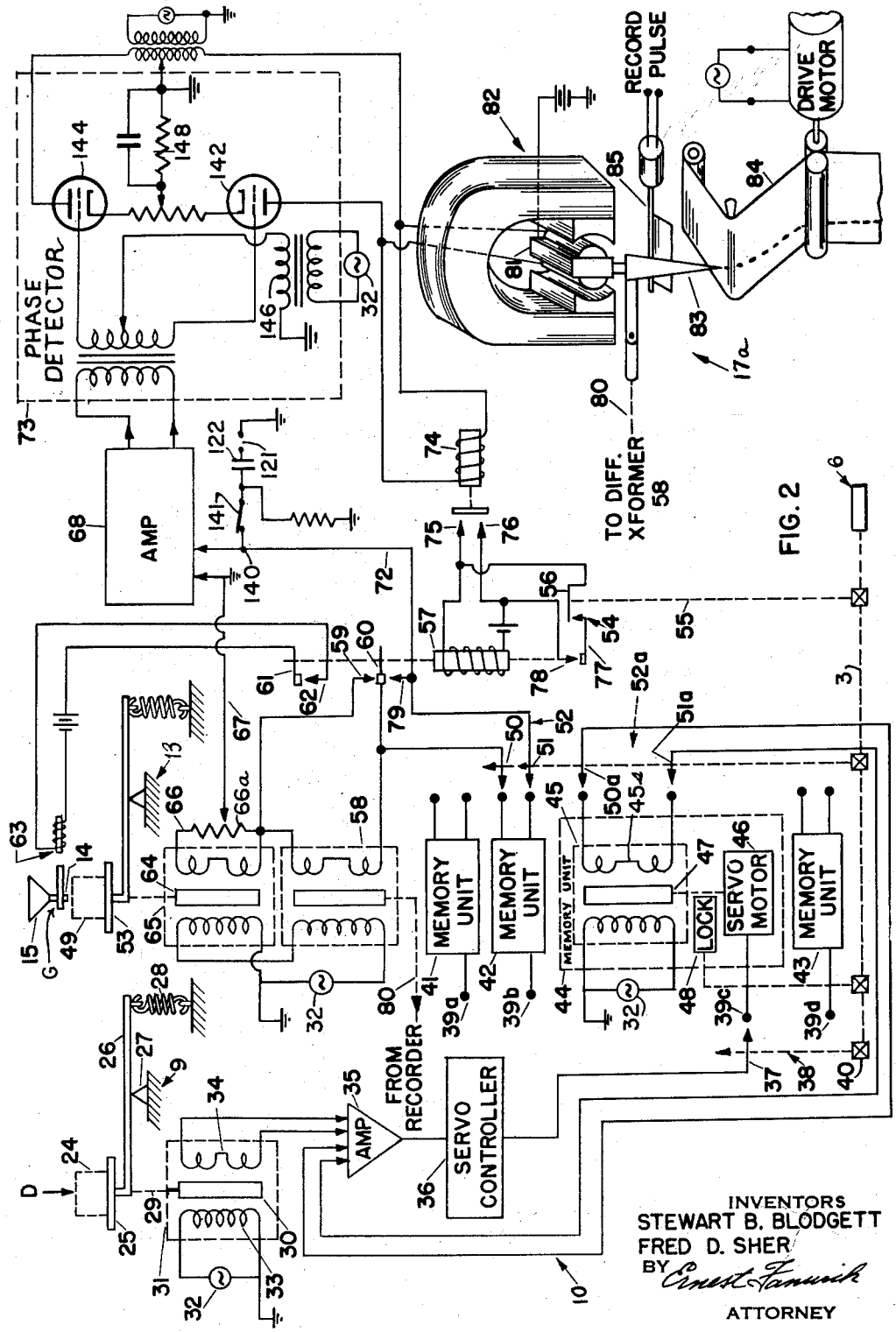

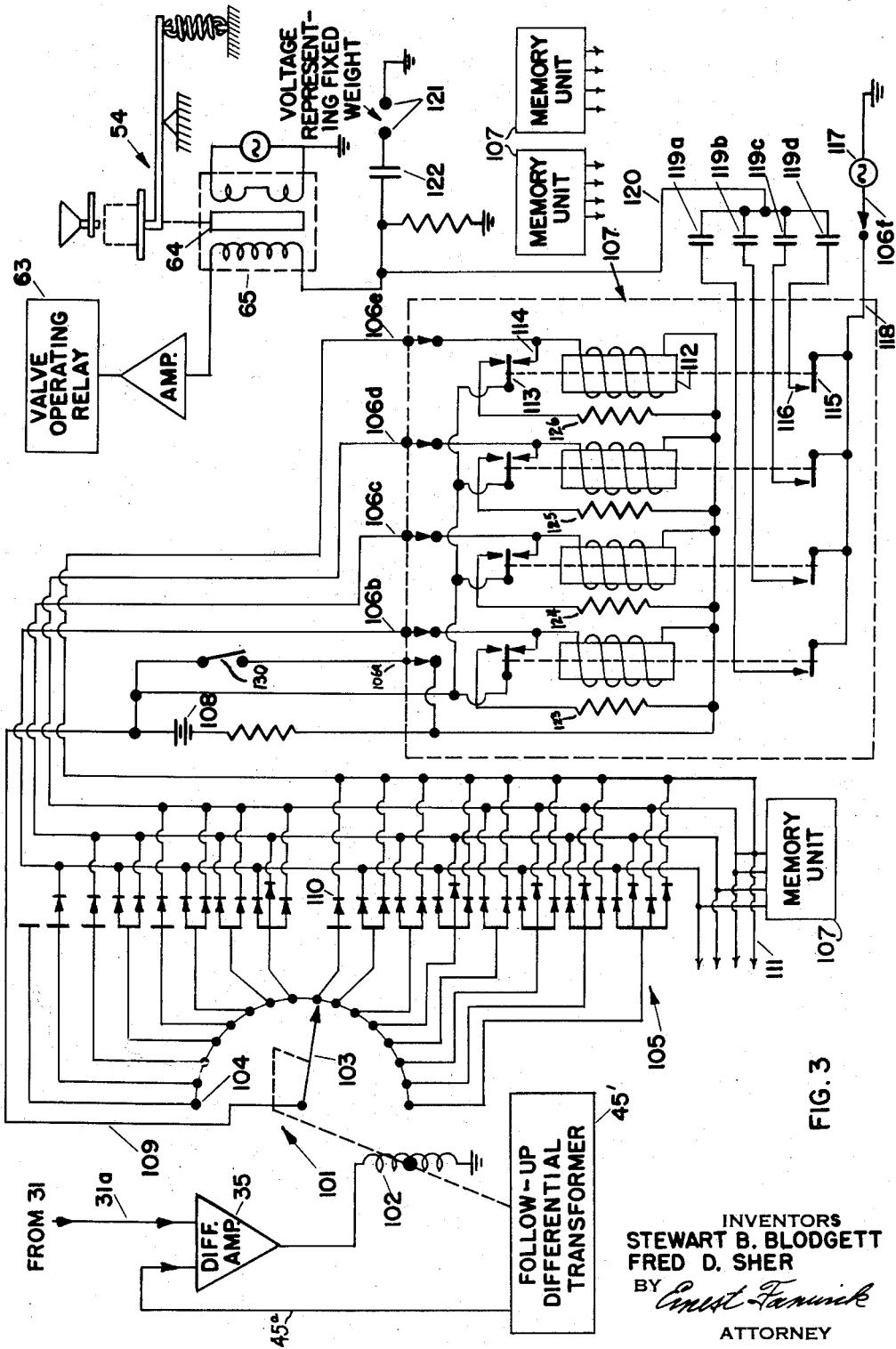

3,073,398
AUTOMATIC WEIGHING AND PACKAGING
APPARATUS
Stewart B. Blodgett, Cedar Grove, N.J., and Fred D. Sher, New York, N.Y., assignors, by mesne assignments, to Foils Packaging Corporation, Cincinnati, Ohio, a corporation of Ohio
Filed Mar. 27, 1956, Ser. No. 574,179
8 Claims. (Cl. 177—53)

This invention relates to automatic weighting devices and more particularly to apparatus for use in a continuous packaging system in which a predetermined weight of material is to be placed in successive containers of varying tare weight.

In the packaging industry it is recognized that the tare weight of an empty container appreciably varies within relatively wide limits. In addition, it is common in some industries to add premium gifts to packages of a product and these premiums cause the tare weight of the containers which are to be filled to vary over an extremely wide range. It is, of course, the usual practice in the packaging industry to fill empty containers or containers including premiums, with a specific predetermined weight of the commodity until the gross weight of the container and contents equals the prescribed net weight of the commodity plus a fixed allowance for the tare weight of the empty container. In order to be certain that the purchaser is getting that minimum quantity of the commodity which he has purchased and to meet certain requirements of law, it has been necessary in the packaging industry to utilize the maximum tare weight of any container as a standard. This practice causes a substantial loss to the producer since the large majority of the empty containers weigh substantially less than the maximum tare weight and thus the difference between the actual tare weight of any container and the maximum observed tare weight of the container is the excess amount of commodity which the producer must package in order to be certain that the requirement of a minimum net weight for the material is met.

Weighing and packaging systems have previously been used which are capable of determining the tare weight of an individual container and compensating for this actual tare weight during the filling process; thus, accurately filling the particular container with the desired net weight of the commodity. In general, these prior art systems have been extremely slow since two weighing operations were necessary and these operations could not be performed simultaneously. In addition, it is usually desirable to perform additional operations to the package between the time the tare weight is determined and the time the final filling operation is to occur. Such additional steps may include the partial filling of the container, an operation which causes the commodity in the container to settle or to be rearranged or an operation in which the empty container is inspected or any one of many other possible processing operations.

It has previously been recognized that, in order for a continuous packaging system to be utilized at its maximum efficiency, it is desirable that a tare weight scale be utilized continuously during the packaging process. The tare weight would then be determined and stored in a memory device during that period of time between the tare weight determination and the final filling of a particular container. The tare weight must be stored even when no intermediate step in the packaging process occurs unless a single container is caused to pass over a tare weight scale and a filling scale before the tare weight of a second container is determined.

It also has been recognized that, if a plurality of tare weight scales and filling scales are provided and a first container is placed on a first tare weight scale which then adjusts a first gross weight scale to compensate for the tare weight of the first container and these two scales are then reserved until the first container is ready for its final filling and weighing, the memory function may be accomplished. During the period when the first tare weight scale and first filling scale are acting as a memory device, successive containers are utilized with other pairs of scales to keep the packaging process continuous. Due to the large number of scales utilized in such a system, this arrangement has obvious disadvantages.

There also has been used in the past a weighing machine in which a tare weight scale is used to weight successive empty containers before they reach a filling scale. A mechanical weight is adjusted in response to a semipermanent registration indicative of the tare weight of the package. A plurality of registering means are employed in order to store independently of the tare weight scale or final weight scale, the tare weights of successive containers. In this prior art system the registering means consisted of a cylinder with a plurality of rods extends therethrough parallel to the axis thereof. The rods were sequentially positioned in accordance with the tare weight and the setting or position of any one such rod acted as a physical registration of the weight of a particular container. Linkage mechanism then adjusted the compensating or balancing weight of the final scale to cause the weight indicated by this scale to be a net weight. This prior art device was dependent upon the physical actuation of the rods by the tare scale and the resultant physical movement by the rods of the compensating weight associated with the filling scale. In many situations the physical dependence of this system becomes a disadvantage, particularly where it is desired to have a large physical separation between the tare weight scale and the filling scale.

One of the objects of this invention, therefore, is to provide a weighing mechanism of which the tare weight of one or more containers may be converted to an electrical signal which may be stored and utilized to remotely adjust the output of a filling scale.

Another object of this invention is to provide automatic weighing apparatus capable of producing and recording an output signal indicative of a net weight of a commodity added to a container whose tare weight was previously determined and converted into an electrical signal which was stored during further operations performed to the empty container.

A further object of this invention is to provide an automatic weighing and packaging system in which the tare weight of a container is converted into an electrical signal which is stored in a memory system and later recalled for use as compensating signal during a later filling and weighing process which results in a control signal for the filling operation.

Briefly, in this invention, weighing means are provided for determining the tare weight of successive containers. An electrical signal indicative of the tare weight of a particular container is generated and stored in a memory device. Successive electrical signals associated with the tare weights of successive containers are stored in successive memory units. A container is weighed during the filling process and its tare weight is recalled in the form of an electrical signal which is utilized to compensate for the tare weight of the container during the filling process and, thus, a net weight is established for the commodity with which the container is filled and the net weight is recorded by cooperating scale recording mechanisms.

The above mentioned and other objects and features of this invention and the manner of attaining them will become more apparent by reference to the following description taken in conjunction with the accompanying drawings, in which:

FIG. 1 is an illustrative diagram partly in block form of one embodiment of automatic weighing and packaging apparatus utilizing our invention;

FIG. 2 is a schematic diagram partly in block form of an automatic weighing apparatus in accordance with one embodiment of our invention; and FIG. 3 is a schematic diagram partly in block form of an alternate embodiment of the tare weight memory system for use in the automatic weighing apparatus.

Referring to FIG. 1 of the drawing, an illustrative diagram partly in perspective view of a packaging system is therein shown to comprise a plurality of successive empty containers 1 disposed at various positions at which the containers remain during the time of one operation. The various operational positions are indicated by the position letters A, B, C, D . . . I. Each of the containers is moved along the packaging ramp 2 responsive to a drive system 3. A motor 4 is coupled through a clutch mechanism 5 to operate the drive 3. The timer 6 operates the clutch 5 during intermittent periods between periods of time when operations are performed to the containers 1. The motor 4, timer 6, clutch 5 and drive unit 3 constitute an intermittent driving system. As an empty container 1 moves opposite a positioning device or positioner 7 a locating element or locator 8 causes the empty container to be placed on the platform of a tare weight scale 9. In FIG. 1 an empty container is shown in position D on the platform of the tare weight scale 9. It will, of course, be understood that premiums or other goods may first be placed in the empty containers 1 prior to their positioning on the tare weight scale 9 and a deficiency in the premium or material may be detected by the output of the tare weight scale 9 being below a predetermined minimum. In such an event, the container having a tare weight below or above a given standard would be rejected from the packaging line in any manner well known in the art.

Assuming, for the purposes of illustration, that the container at position D has the proper premium therein and is located on the platform of the tare weight scale 9, its tare weight is determined and recorded in a tare weight memory unit 10. After the recording of the tare weight of container at position D, the packaging line clutch 5 is actuated by timer 6 to operate the drive mechanism 3 and to step each of the containers to the next position in the packaging system. At the next position E, material from a hopper 11 is added to the empty container in order to partially fill the container with the desired commodity. While the partial filling is taking place, the tare weight of the next empty container now located on the platform tare weight scale 9 is being recorded in the tare weight memory unit 10. The partial filling at position E is commonly done in order that the final filling which takes place at position G can be accomplished in a short time by a relatively thin stream of the commodity, permitting a more accurate filling of the container.

After the partial filling of the empty container, the packaging line is again operated and each container is moved to the next position. The partially filled container from position E is moved to position F where, due to the action of a shaker 12, it is subjected to a vibratory motion which settles the commodity and removes any air bubbles or pockets. After the commodity has been settled, the packaging line is again stepped and the container at position F is moved to the next position G where the final filling operation takes place. A final weight scale 13 is located in such a manner that the package, when properly located under the filling valve 14 of the final hopper 15, rests on the scale platform of the final weight scale 13. Information from the tare weight memory unit 10 is coupled over line 15a to the final weight scale 13 where the tare weight, determined when the container was at position D, is subtracted from the final weight of the container at position G which is indicated by scale 13 and, when the desired net weight is attained, a signal is coupled over line 17 to actuate the closing mechanism of valve 14. If desired, when valve 14 is closed, a signal may be coupled from the scale 13 to a recording unit 17a where the weight of the material added to the container can be recorded. It will, of course, be obvious to those skilled in this art that the actual closing of the valve 14 is, in part, dependent upon the dynamics of the system.

In accordance with well-known principles, if at any stage of the packaging process an indication is obtained that a package does not meet the desired specifications, a gate 18 can be actuated before the package passes the junction of the reject line 19 and the output conveyor 20, and the package which dos not meet the specifications is passed into the reject line 19.

Referring to FIG. 2 a schematic diagram partially in block form of one embodiment of a packaging system in accordance with the principles of our invention is therein shown to comprise a tare weight and memory unit 10, a final weighing unit 13 and a recorder 17a. The empty container 24 is positioned, as hereinbefore described, upon the platform 25 of the tare weight scale 9 whose beam 26 is mounted on fulcrum 27 and is deflected by the weight of container 24 opposing the force exerted by a spring 28. It is, of course, obvious that any other appropriate balance system may be utilized. The mechanical deflection of the scale beam 26 is coupled via linkage 29 to the core 30 of a differential transformer 31. A reference circuit from generator 32 is coupled to the primary differential winding 33 of the differential transformer 31. The amplitude of the output of the secondary windings 34 of the differential transformer 31 is proportional to the position of the core 30 and this output signal from the differential transformer 31 is thus proportional to the tare weight of the container 24. This tare weight signal from transformer 31 is coupled to a differential amplifier 35 where the difference signal between the output of transformer 31 and the output from the secondary coils 45s of a second differential transformer 45 is amplified and coupled as the input to a servo controller unit 36 which is responsive to the difference between the signal output of the differential transformer 31 and the signal output of a differential transformer 45. In accordance with well-known servo-mechanism theory, the output signal of the servo controller unit 36 is utilized to rapidly and accurately position a remotely located servo motor 46.

In the embodiment of the packaging system shown in FIG. 2, the output of the servo controller unit 36 is coupled to the servo motor 46 through the armature 37 of a switch 38. The armature 37 is stepped sequentially to successive contacts, 39a, 39b, 39c or 39d, each time the packaging line is actuated in response to the driving mechanism 3. It is, of course, apparent that the switch 38 may be actuated in response to a mechanical linkage 40 or by the output of the timer unit 6.

A different servo motor 46 and an associated differential transformer 45 are utilized in each memory unit 41, 42, 43 and 44 to store the tare weight information. Only one memory unit 44 is shown in detail, to simplify the drawing. For purposes of illustration, let it be assumed that the tare weight of package 24 is to be stored in the memory unit 44. The armature 37 of switch 38 is positioned to make contact with terminal 39c and the signal from the servo controller unit 36 is coupled to the servo motor 46 which operates in accordance with the input signal from the controller 36. Coupled to the armature of servo motor 46 is the core 47 of the differential transformer 45 which is driven by servo motor 46 in a direction determined by the nature of the signal fed to servo motor 46 from controller unit 36, to provide an output from the differential transformer 45, which will result in a zero output from the differential amplifier 35. When this occurs, the output signal across the output terminals of differential transformer 45 is equal to the signal coupled from differential transformer 31 although of opposite polarity and thus is indicative of the tare weight of the container 24. When the core 47 is located in this final position indicative of the tare weight, a lock 48 is actuated to maintain the movable core 47 in position.

After the tare weight signal is thus stored in the memory unit 44, container 24 is moved off the scale pan 25, as described above in the explanation of FIGURE 1, and a second container is moved onto scale pan 25. At this point, dual switch arms 50a and 51a of switch 52a are moved into contact with matching terminals respectively of memory unit 43 to connect the differential transformer of memory unit 43 to amplifier 35. The tare weight of the second box is then stored in memory unit 43, in the manner described above for the storage of tare weight in memory unit 44. Switch 52a may be operated at the proper time, in any appropriate manner, from the drive system 3.

When the container 24 has progressed to the final filling operation at position G, the information contained in the memory unit 44 is utilized to indicate the tare weight of that container. For purposes of illustration, in FIG. 2, it is assumed that a container 49 is in the final filling position G on the final weighing scale 13 at the same time that the container 24 is positioned on the tare weight scale 9. Under such conditions the dual armatures 50, 51 of a switch 52 are coupled to the output terminals of the memory unit 42 to connect the memory unit to switch arm 60 and to amplifier 68 through lead 72. The core 47 of a differential transformer contained in the memory unit 42 was previously positioned, as heretofore explained for container 24, in response to the tare weight of the container 49. The output signal coupled over armatures 50 and 51 is thus indicative of the tare weight of the container 49. A voltage source 121, corresponding to a designated fixed weight of the commodity to be added to the package 49 is coupled through impedance 122 and switch 141 to terminal 140 in connector 72. When the container 49 is moved on to the scale platform 53, drive mechanism 3 actuates linkage 55 to momentarily move switch armature 56 away from contact 54 thus opening the circuit of contact 54 and armature 56 which was locked in by the previous filling cycle. When the switch 54 is opened it opens the circuit of relay 57 rendering relay 57 inoperative because switch contacts 75 and 76 are open as a result of the previous cycle. This permits normally opened switch 77 to open and causes the output of a "follow-up" differential transformer 58 to be shorted through contact 59 of switch armature 60, which is also released upwardly when relay 57 is rendered inoperative. Simultaneously, the switch armature 61 breaks contact with terminal 62, causing the normally opened filling valve 14 to open because relay 63 becomes inoperative, thus permitting material or commodity to flow from the hopper 15 into container 49.

As the material flows into the container 49 causing the scale platform 53 to be depressed, the core 64 of the differential transformer 65 is depressed. The output voltage of differential transformer 65 is coupled through a voltage divider 66 and via line 67 to the amplifier 68. Simultaneously, the output from the differential transformer in the memory unit 42 is coupled via line 72 to the amplifier 68. The closed switch 59—60 closes a circuit including the memory unit 42, switch 52, connector 72, terminal 140, amplifier 68, connector 67 and a portion 66a of voltage divider 66. This circuit is arranged such that the voltage supplied by the divider portion 66a is in opposition to the voltages supplied by the differential transformer output of memory unit 42 and at terminal 140. Thus, as shown in FIG. 2, if the amplifier 68 is grounded at lead 67, and the difference between the gross weight voltage supplied by divider portion 66a and the tare weight voltage supplied by the differential transformer output of memory unit 42 is fed in parallel with the net weight voltage supplied at terminal 140, the amplifier 68 will read the resulting mixed signal on lead 72 with respect to ground.

It would be obvious to one skilled in the weighing art by electrical means that instead of introducing the gross weight and tare weight voltages in parallel with the net weight to the amplifier as illustrated in FIG. 2, the net weight voltage could be introduced in series with the gross weight and tare weight voltages. The alternating output voltage of the amplifier 68 is applied as the input to a phase detector 73. The direct current output of the phase detector 73 is coupled as a polarity reversible voltage to a polarized relay 74. With no signal fed to the phase detector 73 from amplifier 68, the two triodes 142 and 144 of the phase detector circuit conduct simultaneously and equally. This is due to the simultaneous application of a positive signal to the control grids of tubes 142 and 144, respectively, by the alternating current reference voltage transformer 146. Adjustable network 148 enables the operator to control the tubes' operation such that no current will flow through the coil of relay 74. However, with an alternating current output from amplifier 68, one triode 142 or 144 will conduct more than the other, depending upon the phase relationship between the output of amplifier 68 and the reference output of transformer of 146. This condition will provide a direct current flow in one direction through a coil of relay 74. When the phase relationship between the output of amplifier 68 and that of the reference transformer 146 changes through zero to an opposite phase relationship, the direct current flow through the coil of relay 74 reverses.

As container 49 is being filled, the sum of the tare weight voltage from memory unit 42 and the net weight voltage applied at 140 is greater than the opposing gross weight voltage derived from voltage divider portion 66a. This provides an alternating current output from amplifier 68, which when applied to the phase detector circuit 73, results in a current flow through the coil of relay 74 in a direction to maintain switch contacts 75 and 76 opened. When the signals fed to amplifier 68 balance out and a null condition is reached, current ceases to flow through coil of relay 74 and switch contacts 75 and 76 are closed by relay 74, thus actuating relay 57.

The actuation of the relay 57 closes the armature switch 77 to make contact with terminal 78, locking the relay 57 in its operative or "up" position normally closed switch 54 having previously closed after the actuation of armature 56 by linkage 55 was completed as described heretofore so that, even if the polarity of the voltage applied to relay 74 should later reverse, relay 57 remains operative. The operation of relay 57 also closes switch terminals 61 and 62 to close the valve 14 and stop the flow of material from hopper 15 into the container 49.

After the relay 57 has been operated, causing the filling valve 14 to close, the filling control function of the device is completed and no further operation is necessary. However, if it is desired to record the weight of container 49 after it has been filled, the system may perform the recording function by opening switch 141 by actuation from the timing mechanism 6 or any other suitable means to take the net weight voltage out of the circuit. Relay 57 being energized and locked in when the container 49 came up to weight as described heretofore, armature 60 has closed on contact 79; thereby coupling the outputs of the differential transformer 58 and the voltage divider section 66a of differential transformer 65 in opposition as the input to the amplifier 68 and simultaneously, via armature 60 and terminal 79, shorting the output coils of the memory differential transformer in unit 42 which is coupled to armatures 50 and 51. The core of the "follow-up" differential transformer 58 is mechanically coupled via linkage 80 to the moving coil 81 of the recording galvanometer generally indicated at 82. The galvanometer 82 is operated by coupling the output of the phase detector 73 to the armature coil 81. Thus, the recording galvanometer 82 functions as a servo motor to control the core of the "follow-up" differential transformer 58 which is quickly brought to the proper position. The recording stylus 83, which is attached to the moving coil 81 of the galvanometer 82, assumes a final position in which the output voltage of the differential transformer 58 equals the output voltage of the differential transformer 65.

In operation, the weight of the filled container 49 causes a deflection of the scale platform 53 which, in turn, causes the weight differential transformer 65 to produce an output voltage proportional to the weight placed on platform 53. The recording stylus 83 is deflected in response to the output of the phase detector 73 and, in turn, deflects the core of the "follow-up" differential transformer 58, by an amount proportional to the movement of the stylus 83, which deflection ceases when the deflection produces a voltage output in the secondary of differential transformer 58 equal and opposite to the voltage output of the differential transformer section 65a. Since only a record of the final weight of the filled container 49 is desired, the recording stylus 83 is held off the recording paper 84 by the drop actuator 85 until the container 49 is filled and then is momentarily dropped to make an indication on the recording paper 84 by the drop actuator 85 when the recording system comes to rest. Thus, the weight record on the recording paper 84 consists of a series of dots or dashes, each representing the weight of a single container. It is, of course, apparent that the drop actuator mechanism 85 may be responsive to the packaging line in timing mechanism 6, shown in FIG. 1, and may be actuated just prior to the movement of the containers to the next position.

When the weight is recorded, the filled container is moved by the packaging equipment to the next position and an empty container, which already has had its tare weight recorded, is moved into the filling position G and, as this is done, the packaging line linkage 55 momentarily causes switch 54 to open; restoring the weighing system to the filling control mode of operation. When the device has been returned to the filling control mode, one complete cycle of operation has been achieved.

Referring to FIGURE 3 of the drawing, a schematic diagram, partly in block form, of an alternate embodiment of a tare weight memory system for use in the automatic weighing apparatus of this invention is shown. As previously described above, the output of a tare weight scale is mechanically coupled to a differential transformer 31, which generates a signal indicative of the tare weight scale displacement. This signal, representing the tare weight, is coupled over line 31a to differential amplifier 35. A stepping switch 101, converts the output of the differential transformer coupled through the amplifier 35 into a digital code. The output of the amplifier 35 is coupled to a moving galvanometer type coil 102, of switch 101 which is mechanically coupled to switch arm 103. The switch arm 103 is "stepped" around the contacts 104 in accordance with the magnitude of the output of the amplifier 35. The coil 102 is also mechanically coupled to a follow-up differential transformer 45 whose output is indicative of the position of armature 103 and is connected by 45a to the input terminals of amplifier 35. The output of differential amplifier 35 is thus responsive to the difference between the signals coupled over lines 31a and 45a and the signal output of amplifier 35 is of a magnitude proportional to the difference between the actual position of arm 103 and the position to which it should be moved in response to the signal coupled over line 31a. The magnitude of the signal coupled over line 31a causes the arm 103 to be rotationally positioned or stepped around the contacts 104 and causes the arm 103 to make contact with a terminal representing the magnitude of the signal output of the differential transformer connected to the tare weight scale mechanism. Obviously, a non-ambiguous type of indexing device could be used to insure positive action.

Coupled to the terminals of the stepping switch 101 is a usual binary code diode matrix 105 of a type well known to those skilled in the art, which converts the position of the arm 103, connected to any one of sixteen terminals, into from zero to four simultaneous pulses of a binary code nature. The output of the binary code diode matrix 105 is coupled across arms 106b, 106e, 106d and 106c of a switch 106 and connected to the contacts of a relay bank memory unit 107.

Assuming, for purposes of explanation, that the arm 103 is positioned at a terminal representing a signal of magnitude eight as shown in FIGURE 3, then a voltage is coupled from the D.C. source 108 over line 109 through arm 103 and diode 110 to bus bar 111 and over arm 106e to relay coil 112 where it actuates the relay and causes the armature 113 to make contact with terminal 114, in turn causing the relay 112 to be locked in the operable position. It also causes armature 115 to close and make contact with terminal 116, causing an alternating voltage from source 117 to be coupled over armature 106f and line 118 through armature 115 and contact 116 to an impedance 119d. The output of all the impedances 119a–d are added and coupled over line 120 to a follow-up transformer 65, which has its core 64 coupled to the final weighing scale 54. A voltage source 121, corresponding to the designated fixed weight of the commodity to be added to the package, is coupled through impedance 122 to transformer 65 in opposition to the voltage coupled over line 120 from differential transformer 65. In a manner heretofore explained, the resultant output voltage on line 120 is amplified and utilized to actuate the valve closing relay 63 in the filling mechanism of this invention. It is obvious that, if more than one of the relays are operated, more than one of the impedances 119a–d would have a voltage drop and the voltage coupled over line 120 would be the summation of the voltages appearing across each of the impedances 119a–d. Obviously, the values of the impedances 119a–d must be selected in accordance with the weight to be rendered each pulse appearing on each bus bar.

It is also apparent that a set of relays is required for each of the other memory units which can have its terminals coupled to the switch 106 under influence of the intermittent drive mechanism.

In order to prevent a different voltage appearing across an operated relay coil, it is necessary to include resistances 123—126 having ohmic values equal to the resistances of their associated relay coils. Thus, when the armatures are in the "up" or "inoperative" position, current flows through the auxiliary resistors 123—126, maintaining the voltage through any operative relay coil independent of the number of pulses in the binary code and independent of the number of relay coils operated. Since each of the relay armatures are maintained in a locked position, it is necessary to close switch 130 to short out the relay coils prior to the recording of new tare weight information. This may be accomplished under the control of or responsive to the intermittent drive mechanism.

While we have described our invention with respect to an automatic weighing device, it is readily apparent to those skilled in the art that the illustrative embodiments are subject to many and substantial modifications which come within the scope of our invention. The device is capable of determining and storing and later recalling a plurality of discrete bits of any information translatable into a force capable of proportionately moving an element in this system.

While we have described above the principles of our invention in connection with specific apparatus, it is to be clearly understood that this description is made by way of example only and not as a limitation to the scope of our invention as set forth in the objects and features thereof and in the accompanying claims.

We claim:
1. A weighing system comprising a first weighing scale; a first differential transformer including a first element movable in response to the displacement of said scale and having an output proportional to the displacement of said weighing scale; a servo controller coupled to said first differential transformer and having an output responsive to the output of said first differential transformer; a plurality of memory units each having a servo motor, and a second differential transformer including a second movable element connected to said servo motor; means coupling said output of said servo controller to said servo motor to position said second movable element to indicate a weight applied to said first weighing scale; a locking mechanism associated with each of said memory units to cause said second movable element thereof to lock in position; a second weighing scale; a third differential transformer having a third movable element connected to said second scale to provide an output responsive to the displacement of said second scale; means for controlling the displacement of said second scale; and means coupling in opposition to said displacement controlling means, the outputs of said third differential transformer and one of said second differential transformers.

2. A weighing system comprising a weighing scale; a first differential transformer, including a first element movable in response to the displacement of said scale and having an output proportional to the displacement of said weighing scale; a servo controller coupled to said first differential transformer and having an output responsive to the output of said first differential transformer; a plurality of servo motors; a plurality of second differential transformers each having a different second movable element associated with a different one of said servo motors; means coupling said output of said servo controller to one of said servo motors; means responsive to said one of said servo motors to position one of said second movable elements in the second differential transformer associated therewith to provide an output from said associated second differential transformer; a second weighing scale; a third differential transformer having a third element movable in response to the displacement of said second scale and having an output responsive to the displacement of said second scale; means for controlling the displacement of said second scale; and means coupling in opposition, the outputs of said third differential transformer and said associated second differential transformer to said second scale displacement controlling means.

3. A packaging system in which material is to be added to each of a plurality of containers having varying tare weights comprising; first weighing means for determining the tare weight of successive containers; means for generating in response to said first weighing means successive electric signals indicative of the tare weights of successive ones of said containers; means for storing said successive signals; second weighing means for determining the filled weight of one of said containers; means for generating a second electric signal in response to said second weighing means; means for controlling the filled weight of said one container and means responsive to the difference of said second electric signal and one of said successive stored signals associated with the container being weighed by said second weighing means to operate said means controlling the filled weight of said container.

4. An automatic weighing and packaging system comprising a first weighing scale; a plurality of containers; intermittent driving means for presenting in succession said plurality of containers to said first scale; a first differential transformer including an element movable in response to the displacement of said first scale and having an output proportional to the displacement of said first weighing scale; a servo controller coupled to said first differential transformer and having an output responsive to the output of said first differential transformer; a plurality of servo motors; a plurality of second differential transformers each connected to one of said servo motors; means responsive to said driving means for coupling said output of said servo controller to one of said servo motors; means responsive to said one of said servo motors to position a movable element in its associated second differential transformer to indicate a weight associated with one of said containers; a second weighing scale; means responsive to said driving means for presenting in succession said containers to said second scale; a third differential transformer having an element movable in response to the displacement of said second scale and having an output responsive to the displacement of said second scale; means for filling with material said one container on said second scale; means operatively responsive to said driving means to couple to said filling means the output from said one of said second differential transformers indicating a weight associated with said one container in opposition to said output of said third differential transformer to cause said filling means to operate.

5. A weighing system comprising a first weighing scale; means to generate successive first electric signals responsive to successive forces applied to said first scale; means to generate a succession of pulse code signals responsive to said first electric signals; a plurality of memory units to store said successive pulse code signals; each of said memory units comprising a plurality of relays positioned responsive to said pulse code; means to generate a second electric signal responsive to position of the relays on one of said memory units; a second weighing scale; means to generate a third electric signal in opposition to said second signal and responsive to the force applied to said second scale; means to control the amount of said force applied to said second scale; means providing a fourth signal in opposition to said third signal and representing a fixed weight value; and means coupling said second, third and fourth electric signals with said control means.

6. An automatic weighing and filling system comprising a first weighing scale, intermittent driving means for presenting in succession a plurality of containers to said first scale, means for generating successive first electric signals each responsive to the movement of said first scale due to the weight of one of said containers, plural electrical storage means for individually storing said successive first electric signal, a second weighing scale having a movable element, means responsive to said driving means for successively presenting each of said containers to said second scale, means responsive to the movement of said movable element of said second scale for generating a second electric signal responsive to the weight of the container thereon, controllable container fill means for filling each container presented to the second scale, means for coupling in opposition said second signal and said stored first electric signal to obtain a difference signal, and control means coupled to said container fill means for stopping the filling of the container when said difference signal reaches a predetermined magnitude.

7. An automatic weighing and packaging system comprising a first weighing scale; intermittent driving means for presenting in succession a plurality of containers to said first scale; a first differential transformer including a first element, movable in response to the displacement of said first scale by one of said containers to provide a first output signal of one phase proportional to the displacement of said first scale; a servo controller coupled to said first differential transformer for receiving said first output signal; a plurality of memory units each having a different servo motor and a different second differential transformer operatively connected thereto; each of said different second differential transformers having a second movable element connected to the servo motor associated therewith; means coupling the output of said servo controller to one of said servo motors to position said second movable element of said second differential transformer associated therewith to provide a second output signal from said connected second differential transformer of an opposite phase to said first signal, means coupling said second output signal to said servo controller; a locking mechanism associated with each of said memory units and operatively responsive to said driving means to lock said second movable elements in a position providing said second output signal; a second weighing scale; means responsive to said driving means for presenting in succession said containers to said second scale; a third differential transformer having a third element movable in response to the displacement of said second scale and having a third output voltage responsive to the displacement of said second scale; means for filling said one container positioned on said second scale with a given material; an amplifier; means operatively responsive to said driving means to couple to said amplifier said second output signal from said second differential transformer to the output of said third differential transformer when said one container is positioned on said second scale; means connected to said coupling means to apply to said amplifier a voltage representative of a fixed weight and in opposition to said third output voltage of said third differential transformer; and means responsive to the output of said amplifier to operate said filling means.

8. An automatic weighing and packaging system comprising a first weighing scale; a plurality of containers; intermittent driving means for presenting in succession said plurality of containers to said first scale; a first differential transformer including a first element movable in response to the displacement of said first scale and having a first output signal proportional to the displacement of said first scale; a servo controller coupled to said first differential transformer to receive said first output signal from said first differential transformer; a plurality of servo motors; a plurality of second differential transformers each connected to one of said servo motors; means responsive to said driving means for coupling said output of said servo controller to one of said servo motors; means responsive to said one servo motor to produce a second output signal from its coupled second differential transformer; means coupling said second output signal to said servo controller in opposition to said first output signal to provide a null state in said servo controller output; a second weighing scale; means responsive to said driving means for presenting in succession said containers to said second scale; a third differential transformer having a second element movable in response to the displacement of said second scale and having a third output signal responsive to the displacement of said second scale; means operatively responsive to said driving means when said one of said containers is positioned on said second scale to couple the second output signal from said one of said second differential transformers to said third output signal; an amplifier; means coupling in opposition to said amplifier the output of said third differential transformer and the output of said one of said second differential transformers; means connected to said last coupling means to provide in opposition to said output of said third differential transformer a signal representing a net weight; recording means movable in response to the output of said amplifier; a fourth differential transformer having a movable element responsive to the movement of said recording means to provide an output in opposition to said output of said amplifier; and means responsive to the output of said amplifier to decouple said second differential transformer from the input to said amplifier and to couple said fourth differential transformer to the input of said amplifier.

References Cited in the file of this patent

UNITED STATES PATENTS

| | | |
|---|---|---|
| 1,028,851 | Bard | June 11, 1912 |
| 2,351,606 | Gold et al. | June 20, 1944 |
| 2,503,295 | Palmer | Apr. 11, 1950 |
| 2,598,812 | Marco et al. | June 3, 1952 |
| 2,610,052 | Macgeorge | Sept. 9, 1952 |
| 2,623,636 | Pounds | Dec. 30, 1952 |
| 2,645,447 | Clark et al. | July 14, 1953 |
| 2,646,270 | Thayer | July 21, 1953 |
| 2,675,222 | Clark | Apr. 13, 1954 |
| 2,680,012 | Bozoian | June 1, 1954 |
| 2,688,457 | Merrill et al. | Sept. 7, 1954 |
| 2,709,076 | Hansen | May 24, 1955 |
| 2,766,981 | Lauler et al. | Oct. 16, 1956 |
| 2,767,974 | Ballard et al. | Oct. 23, 1956 |
| 2,801,874 | Macgeorge | Aug. 6, 1957 |
| 2,819,054 | Thorsson | Jan. 8, 1958 |
| 2,843,820 | Daykin et al. | July 15, 1958 |
| 2,868,491 | Thorsson et al. | Jan. 13, 1959 |

FOREIGN PATENTS

| | | |
|---|---|---|
| 517,428 | Canada | Oct. 11, 1955 |
| 880,182 | France | Dec. 18, 1942 |